United States Patent [19]
Fujita

[11] Patent Number: 5,878,770
[45] Date of Patent: Mar. 9, 1999

[54] PRESSURE RELEASE MECHANISM FOR HEATING APPARATUS USING SATURATED VAPOR AS HEATING MEDIUM

[75] Inventor: Atsuhisa Fujita, Tokyo, Japan

[73] Assignee: Toyo Electric Co., LTD., Tokyo, Japan

[21] Appl. No.: 923,830

[22] Filed: Sep. 4, 1997

[30] Foreign Application Priority Data

Sep. 13, 1996 [JP] Japan ................................ 8-243540

[51] Int. Cl.$^6$ .................................................. F16K 13/04
[52] U.S. Cl. ..................................... 137/68.19; 137/68.23
[58] Field of Search ........................... 137/68.19, 68.23, 137/68.25

[56] References Cited

U.S. PATENT DOCUMENTS

| | | | |
|---|---|---|---|
| 2,962,038 | 11/1960 | Bird | 137/68.23 |
| 4,505,289 | 3/1985 | Wilson | 137/68.25 |

*Primary Examiner*—John Fox
*Attorney, Agent, or Firm*—Price, Heneveld, Cooper, DeWitt & Litton

[57] ABSTRACT

A pressure release mechanism for a heating apparatus using saturated vapor of a heating medium according to this invention will completely prevent undesirable intrusion of the air into a heating chamber even when the pressure within the chamber reduces down below the atmospheric pressure either during operation or out of operation of the heating apparatus, and also enables an easy replacement of the rupture plate when required.

The mechanism comprises a pair of metal pipes, each having a flange at one end thereof, a plate holder disposed to either one of said two flanges, a rupture plate welded onto said plate holder, fastening means which secure said pair of flanges with each other, and a seal cover extending over and between said pair of flanges and welded thereto so as to cover said fixture portion in an air tight manner.

19 Claims, 4 Drawing Sheets

PRESSURE RELEASE MECHANISM FOR HEATING APPARATUS USING SATURATED VAPOR AS HEATING MEDIUM

BACKGROUND OF THE INVENTION

1. Field of the Invention

The present invention relates to a pressure release mechanism for a heating apparatus using saturated vapor as a heating medium, which will be widely used for manufacturing and forming synthetic resin products and others.

2. Description of the Prior Art

Heretofore this type of pressure release mechanism has been provided as shown in FIGS. 10 and 11 by way of example. In FIG. 10 a heating apparatus 71 in which saturated vapor is used as a heating medium includes a heating chamber 72, a heating medium in liquid 73 suitably selected depending on required heating temperature and accommodated therein, an electric heating device 74, saturated vapor 75, a heating zone 76 in which an object is placed to be heated, and a pressure release mechanism 77.

A pressure release mechanism for such heating apparatus is constructed as shown in FIG. 11 by way of example, which includes flanges 78, and pipes 79 connected therewith by welding 80. The flanges are fixed with each other by bolts served as fastening means 81. The mechanism further includes a rupture plate 83 which is made of metal such as aluminum, silver, Inconel, stainless, etc. and is placed in air tight condition by use of packing such as an O-seal ring made of Teflon, metal, etc.

When the pressure within said heating chamber 72 in FIG. 10 increases to a predetermined level, the rupture plate 83 will break and split open to release the internal saturated vapor out of the heating chamber 72 so as to prevent an excessive increase of the internal pressure.

Such known mechanism, however, has a drawback in that while in operation, the heating chamber 72 keeps the internal pressure at a level higher than the atmospheric pressure, the internal pressure decreases down to a level below the atmospheric pressure when the power 85 is turned off and the apparatus is left out of service, and with a lapse of time a slight volume of the air intrudes in the heating chamber 72 via the seal ring 84 due to unknown reasons. Even the use of a modified seal ring made of Teflon or metal has failed to achieve strict protection from the air intrusion causing such intrusion in a long, for instance 10 days of, suspension of operation.

Such intruded air deteriorates heat transmission capacity of the heating chamber 72 and needs to be forced out of the chamber before the apparatus is restarted, and the apparatus needs to be kept out of operation during the procedure. The apparatus is also provided with a branch pipe, not shown, having a valve and disposed on the pipe 79 located upstream of the pressure release mechanism 77 in order to exhaust the intruded air. The branch pipe is closed by the valve after use.

SUMMARY OF THE INVENTION

It is therefore an object of the present invention to solve such drawback of the conventional heating apparatus of this type, by providing a pressure release mechanism for a heating apparatus using saturated vapor of a heating medium which is able to completely prevent undesirable intrusion of the air into the chamber even when the internal pressure within the same reduces down below the atmospheric pressure in the non-operative condition with the power off.

It is another object of the present invention to provide a pressure release mechanism for a heating apparatus using saturated vapor of a heating medium which prevents any air intrusion into the chamber and hence allows the apparatus to operate properly on any such occasion that the internal pressure is below the atmospheric pressure during the operation of the apparatus.

According to the present invention, a pressure release mechanism for a heating apparatus using saturated vapor of a heating medium comprises: a pair of metal pipes 2, 2, a pair of flanges 1, 1 one each connected air tight to an open end of said pipes 2, a plate holder 4 disposed on either one of said flanges 1 in communication with said pipes 2, a rupture plate 3 interposed between said pair of pipes 2, 2 and disposed onto said plate holder 4 by welding 5, a base 8 formed by securing 7 said pair of flanges 1, 1 with each other by use of fastener means 6 such that said pipes 2, 2 oppose each other in mutually aligned relationship, and a seal cover 9 of metal disposed and extending over and between said pair of flanges 1, 1 and sealed by welding 5 to cover said fixture portion in an air tight manner.

Because of the above arrangement that a metal seal cover 9 extends over and between a pair of metal flanges 1, 1 which are connected air tight on metal pipes 2, 2, in a manner to be welded to said flanges 1, 1 to cover the fixture portion at which said flanges 1, 1 are fixed with each other, added with the arrangement that a metal rupture plate 3 interposed between said pipes 2, 2 is welded onto the plate holder 4 which is disposed on either one of said flanges 1, 1, the pressure release mechanism achieves a complete air tightness without leakage when the heating apparatus 20 is out of operation and the pressure within the chamber 20 is reduced to the level lower than the atmospheric pressure, even when operation is suspended relatively long. Such air tightness can be maintained also in case the pressure within the chamber decreases to lower than the atmospheric pressure during the operation of the apparatus.

Moreover, in case the rupture plate 3 breaks the seal cover 9 can be easily split open by a rotation cutter, etc. to enable unfastening of the fixed portion 7 for replacement of the broken rupture plate 3.

A pressure release mechanism according one aspect of the present invention comprises a base 8 which includes a seal means or packing 10 interposed between said pair of flanges 1, 1.

This arrangement provides the double seal to the pressure release mechanism and enables ideal prevention of air leakage.

A pressure release mechanism according to another aspect of the present invention comprises a seal cover 9 which is welded to a pair of flanges 1, 1 at an annular ledge or protrusion thereof.

This arrangement serves to make thermal deformation of the flanges 1, 1 as low as possible and prevents a mechanical defect of the mechanism.

A pressure release mechanism according to still another aspect of the present invention comprises a seal cover 9 which includes outer protrusions 13 which are welded with each other.

This arrangement allows an easy access to the rupture plate 3 for replacement thereof when required because such protrusions 13 can be cut off very easily by a cutter tool such as a rotational cutter so as to open the cover.

A pressure release mechanism according to a still another aspect of the present invention comprises a seal cover 9 which includes at least one frangible line 14 which is endless and thin-walled so that it can be easily split open.

This arrangement of forming an endless thin-walled frangible line 14 on the cover allows an easy access to the rupture plate 3 for replacement thereof when the plate 3 is broken because the line 14 can be easily split open by use of an appropriate tool.

A pressure release mechanism according to a still another aspect of the present invention comprises a seal cover 9 which includes a pull member 15 to be used for splitting the cover open along said frangible line 14.

This arrangement facilitates easy splitting up of the line 14 by pulling the pull member 15 outward and allows easy access to the rupture plate 3 for its replacement when it is broken.

A pressure release mechanism according to a further aspect of the present invention comprises a seal cover 9 which includes a tongue 16 and a handle 17 for rolling up a part of said cover 9 to split open the same.

This arrangement for rolling up with a tongue 16 and a handle 17 facilitates easy splitting up of the cover 9 and allows easy replacement of the rupture plate 3 when it is broken.

A pressure release mechanism according to a still further aspect of the present invention comprises a seal cover 9 which includes a tubular nose 19 for leakage test in communication with the exterior and the interior of the cover.

By this arrangement of providing a test tube 19 on said cover 9, air leakage test of the mechanism can be facilitated by connecting a vacuum pump to the tube 19 in communication thereto and filling a helium gas or the like around the mechanism. The tubular nose 19 is closed by welding, etc. after a good test result is achieved. Thus this simple construction facilitates air tightness test of the mechanism, and at the same time can be used for extraction of the air within the cover 9 to prevent any air inside the cover 9 from being sucked and intruding in the heating apparatus 20 with a lapse of time.

According to still another aspect of the present invention, a heating apparatus 20 having such pressure release mechanism 21 includes a pressure control switch 24 for controlling a gate switch 23 for a heater 22 of said heating apparatus 20 in such manner that between the pressure level A at which said pressure switch 24 is actuated and the pressure level B at which said pressure release mechanism 21 is actuated, there is a relation of A<B.

By this arrangement the gate switch 23 operates to switch off the heater 22 before the pressure inside the heater 20 reaches the level at which the pressure release mechanism 21 is actuated, thus a premature burst of the rupture plate 3 of the mechanism 21 can be prevented.

According to still another aspect of the present invention, in a heating apparatus having such pressure release mechanism, said pressure switch 24 includes a bellows 25 and a microswitch 26.

In this arrangement said bellows 25 extends or stretches as the pressure within the heating apparatus 20 increases, which in turn actuates said microswitch 26 connected thereto. Thus the pressure within the apparatus can be communicated to said microswitch 26 via above constructed bellows 25 such that said switch 26 is actuated in a reliable manner.

These and other features, objects, and benefits of the invention will be recognized by those who practice the invention and by those skilled in the art, from reading the following specification and claims, together with reference to the accompanying drawings.

DETAILED DESCRIPTION OF THE PREFERRED EMBODIMENTS

Figure 1:
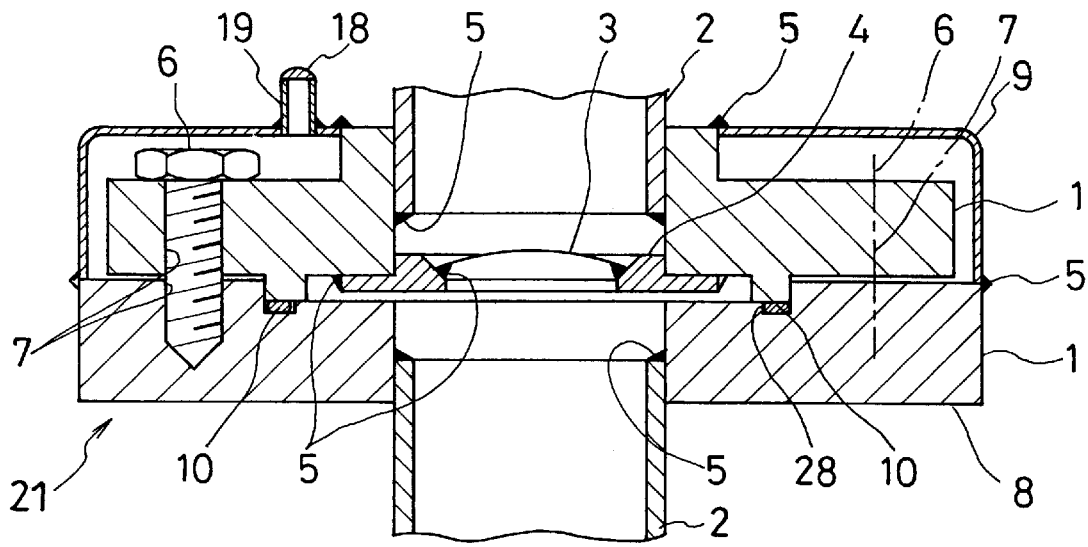
FIG. 1 is a cross-sectional view of a pressure release mechanism for a heating apparatus using saturated vapor of a heating medium according to a first embodiment of the present invention.

In FIG. 1, the invented pressure release mechanism 21 includes a pair of metal flanges 1, 1, each connected to a pipe 2 by welding 5, and a plate holder 4 welded to either one of the flanges 1. The plate holder 4 may not be welded but formed integrally to the flange 1. The present invention includes any such applications.

A metal rupture plate 3 is disposed on the plate holder 4 by welding. The rupture plate 3 is made of metal such as aluminum, silver, stainless, Inconel, etc., and will break or split open at a predetermined pressure level, to prevent an excessive increase of the pressure within the heating apparatus 20. Fasteners 6, say bolts by way of example, fix two flanges with each other tightly to form a base 8.

A seal cover 9 made of metal extends between the two flanges 1, 1 to cover the fastened portion 7 and is welded air tight onto the flanges 1, 1 at beads 5.

Packing 10, formed as an O-shaped ring made of metal or Teflon, is disposed in a groove 28 therefor as shown in FIG. 1.

Figure 2:
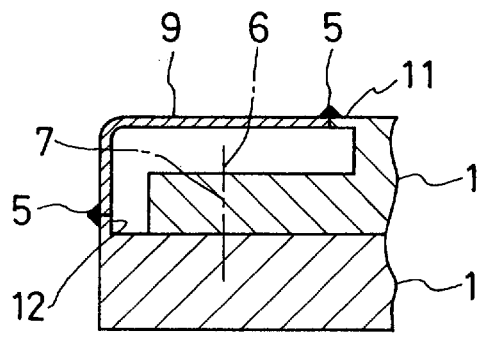
FIG. 2 is a partial view of a mechanism corresponding to FIG. 1, according to a second embodiment of the present invention.

The seal cover 9 may be welded to an annular ledge or protrusion 11, 12 provided on the flanges 1 as shown in FIG. 2, in order to prevent undesirable thermal deformation or distortion of the flanges 1 during the welding process which could lead to a mechanical defect of the mechanism 21.

Figure 3:
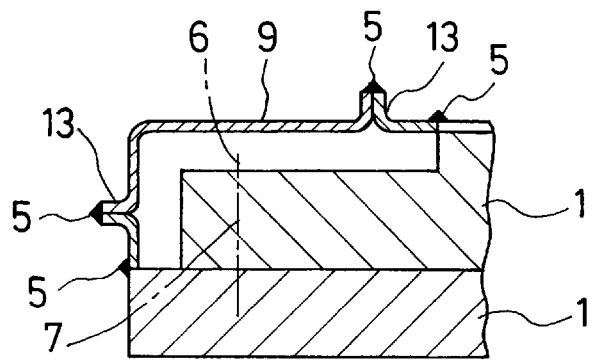
FIG. 3 is a partial view of a mechanism corresponding to FIG. 1, according to a third embodiment of the present invention.

FIG. 3 shows another example of the seal cover 9, wherein outer protrusions 13 are formed and welded with each other. This arrangement allows an easy access to the rupture plate 3 in case of its replacement because such protrusions can be cut off very easily by a cutter tool such as a powered rotation cutter to enable opening of the cover 9.

Figure 4:
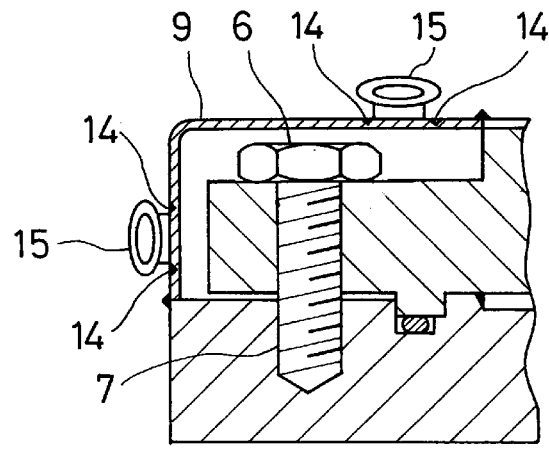
FIG. 4 is a partial view of a mechanism corresponding to FIG. 1, according to a fourth embodiment of the present invention.
Figure 5:
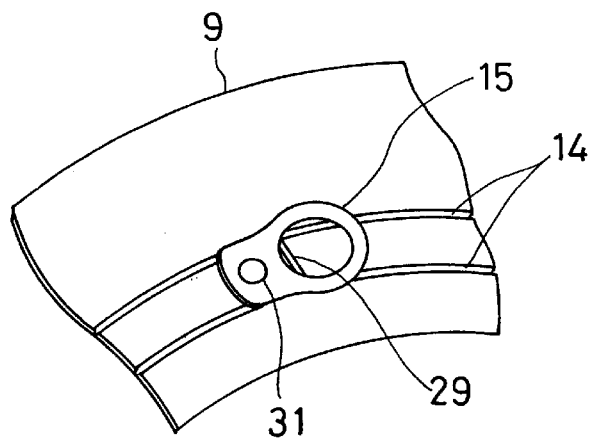
FIG. 5 is a partial perspective view of the mechanism of FIG. 4.
Figure 6:
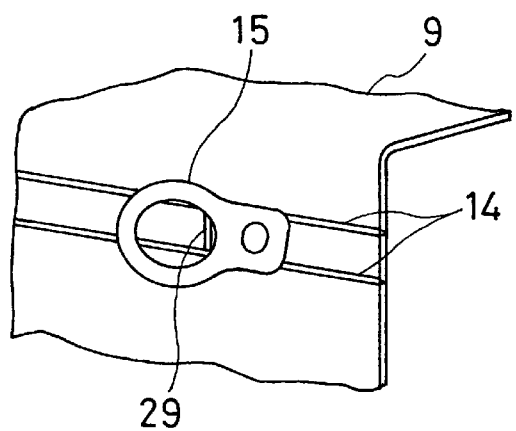
FIG. 6 is another partial perspective view of the mechanism of FIG. 4, FIG. 7 a view corresponding to FIG. 5, according to a fifth embodiment of the present invention.

As shown in FIGS. 4 to 6, the seal cover 9 may be provided with at least one frangible line 14 formed of an endless thin-walled groove along which the seal cover 9 may be easily broken, to split open at ease when an external impact is given with a tool such as a screw driver, a hammer and a cutter, facilitating easy replacement of the broken rupture plate 4.

A pull 15 may be provided on the seal cover 9 in contact with or close to the frangible line 14 as shown in FIGS. 4 to 6. When the pull 15 is raised up, the frangible line 29 nearest the pull will split open at first, to be followed by an entire ripping up of the frangible line 14 by a further pull action along the line 14, thus enabling an easy removal of the seal cover 9.

Figure 7:
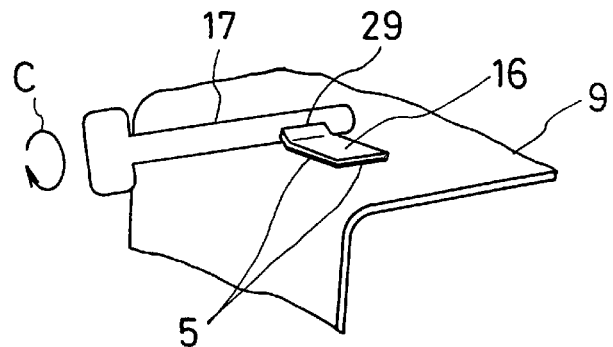
Figure 8:
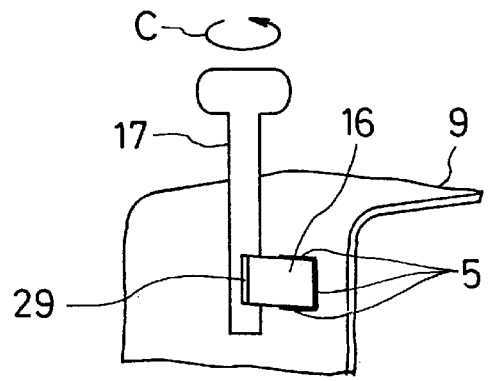
FIG. 8 is a view corresponding to FIG. 6, according to a sixth embodiment of the present invention.

FIGS. 7 and 8 show a seal cover removal system according to other embodiments of the present invention, which includes a tongue 16 welded onto a part of the seal cover 9 at a bead 5 and a roll-up handle 17 connected to the tongue 16. The tongue 16 is welded to the cover 9 at some part and inserted fixedly into an aperture of the handle 17 at another part. For the removal of the seal cover 9, the handle 17 is rotated in the direction indicated by C in FIGS. 7 and 8, thereby the cover is cut off at ease.

Back to FIG. 1, numeral 19 denotes a leakage test tubular nose formed on a part of the seal cover 9 for a leakage or air tightness test. The tubular nose 19 is formed open before the leakage test. For the test, a vacuum pump (not shown) can be easily connected thereto and a helium gas, for instance, will be filled in a housing (not shown) surrounding the pressure release mechanism 21. After the leakage test, the tubular nose 19 is closed by welding, caulking, etc. as indicated by numeral 18 in FIG. 1.

Figure 9:
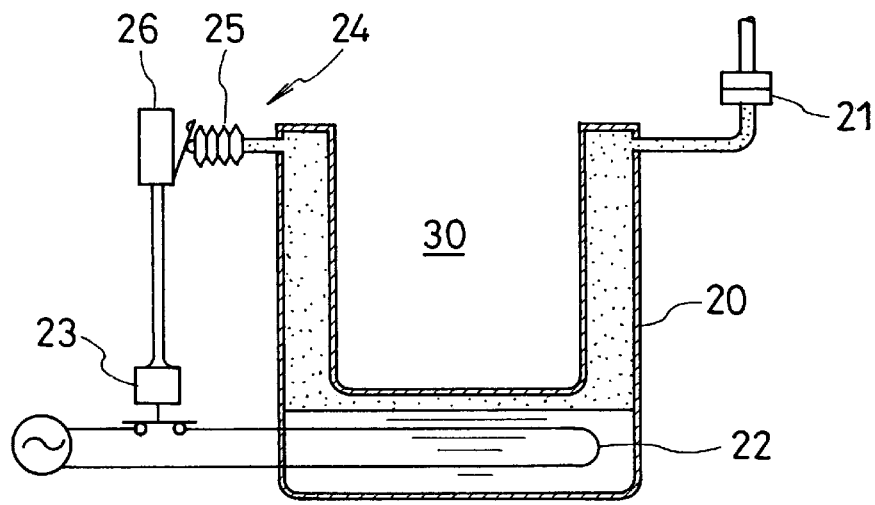
FIG. 9 is a cross-sectional view of a heating apparatus using saturated vapor of a heating medium, according to a seventh embodiment of the present invention.
Figure 10:
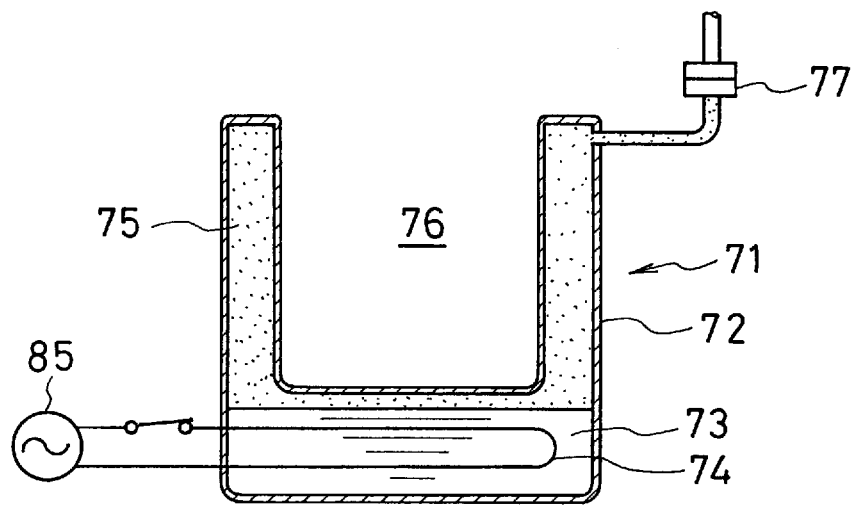
FIG. 10 is a cross-sectional view of a conventional heating apparatus using saturated vapor of a heating medium.
Figure 11:
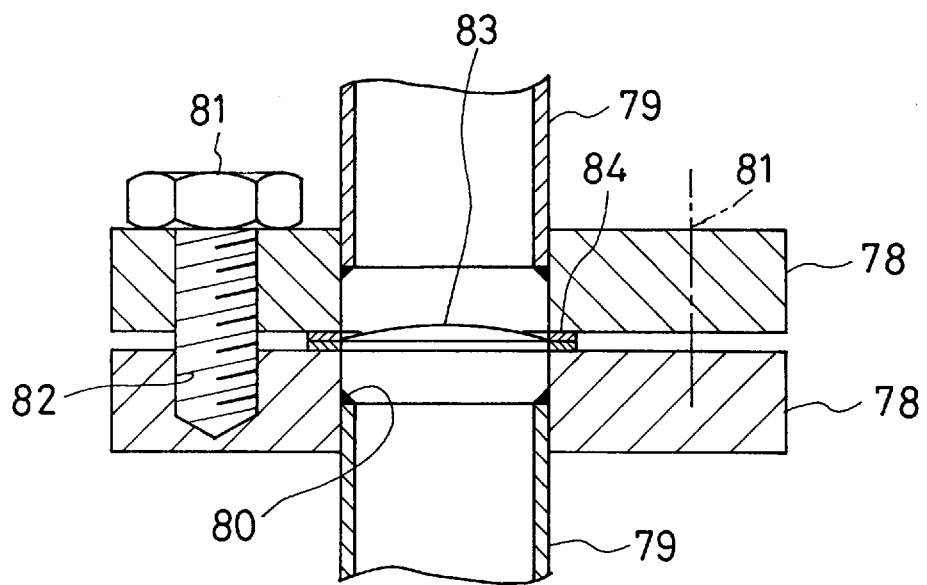
FIG. 11 is an enlarged partial view of the conventional heating apparatus of FIG. 10.

In FIG. 9, the heating apparatus includes a pressure control switch 24 operatively connected to and in communication with the heating chamber 20. The pressure control switch 24 is provided to control a gate switch 23 for the heater 22 in such manner that between the pressure level A at which the pressure switch 24 is actuated and the pressure level B at which the pressure release mechanism 21 is actuated, there is a relation of A<B. With this setting, prior to the actuation of the pressure release mechanism 21, the pressure switch 24 is actuated to switch off the heater 22 by way of the gate switch 23, thus reducing the pressure within the heating chamber 20 and preventing a premature burst of the rupture plate 3 in the pressure release mechanism 21. As shown in FIG. 9, by way of example, the pressure switch 24 includes a bellows 25 and a microswitch 26 to be actuated by way of the bellows 25. The bellows 25 extends or stretches as the pressure within the chamber 20 increases to thereby turn on the microswitch 26 in a relatively reliable manner, which in turn disconnects the gate switch 23 to switch off the heater 22 of the apparatus.

In operation of the heating apparatus 20 having the pressure release mechanism, a batch of materials such as thermoplastic polymers (not shown) is placed in a heating zone 30 and melted to a predetermined temperature to be served for molding by a molding apparatus not shown. In case the rupture plate 3 splits open due to increase of the pressure within the chamber 20, the seal cover 9 and then the fasteners 7 are removed in the manner described hereinabove to replace the broken plate 3.

In the first embodiment, the rupture plate 3 is welded onto the plate holder and the holder is welded to the flange 1. For replacement of the rupture plate 3, the broken plate may be removed together with the plate holder 4 by cutting with a rotation cutter, etc. the welded parts or beads 5 between the flange 1 and the plate holder 4, then a new set of a plate holder 4 and a rupture plate 3 welded thereto may be welded onto the flange 1 as a replacement.

Alternatively, the broken plate 3 alone may be replaced leaving the plate holder 4 unremoved. In case the plate holder 4 is an integral part of the flange 1, only the rupture plate 3 is replaced. Any such embodiments are within the scope of the present invention.

With the arrangement according to of the present invention wherein a metal cover 9 extends over and between a pair of metal flanges 1, 1 connected air tight on metal pipes 2 and is welded to said flanges 1, 1 to cover the fixture portion at which said flanges 1, 1 are fixed with each other, and also wherein a metal rupture plate 3 interposed between said pipes 2, 2 is welded onto the plate holder 4 which is disposed on either one of said flanges 1, 1, the pressure release mechanism achieves a complete air tightness which enables prevention of the air leakage when the heating apparatus is out of operation and the pressure within the chamber is reduced to the level lower than the atmospheric pressure. Such air tightness can be maintained also in case the pressure within the chamber decreases to lower than the atmospheric pressure during the operation of the apparatus.

Moreover, in case the rupture plate 3 breaks the seal cover 9 can be easily split open by a rotation cutter, etc. to enable unfastening of the fixed portion 7 for replacement of the broken rupture plate 3.

The arrangement according to the present invention provides the double seal to the pressure release mechanism and enables ideal prevention of air leakage.

The arrangement according to the present invention serves to make thermal deformation of the flanges 1, 1 as low as possible and prevents a mechanical defect of the mechanism.

The arrangement according to the present invention allows an easy access to the rupture plate 3 for replacement thereof because the outer protrusions 13 welded with each other can be cut off very easily by a cutter tool such as a rotational cutter to enable opening of the cover.

The arrangement of forming at least one endless thin-walled frangible line 14 on the cover according to the present invention allows an easy access to the rupture plate 3 for replacement thereof when it is broken because the line 14 can be easily split open by use of an appropriate tool.

The arrangement according to the present invention facilitates easy splitting up of the line 14 by pulling the pull 15 outward and allows easy access to the rupture 3 plate for its replacement when it is broken.

The arrangement for rolling up a part of the seal cover 9 with a tongue 16 and a handle 17 according to the present invention facilitates easy splitting up of the cover 9 and allows easy replacement of the rupture plate 3 when it is broken.

By the arrangement of providing a test tube 19 on the cover 9, air leakage test of the mechanism is facilitated by connecting a vacuum pump to the tube and filling a helium gas or the like around the mechanism. The tubular nose 19 is closed 18 by welding, etc. after good test result is achieved. Thus this simple construction facilitates air tightness test of the mechanism, and further, can be used for extraction of the air within the cover 9 by way of the vacuum pump and served to prevent any such air to be sucked and intrude in the heating chamber 20, By the arrangement according to the present invention, the gate switch 23 operates to switch off the heater 22 before the pressure inside the heating apparatus 20 reaches the level at which the pressure release mechanism 21 is actuated, thereby preventing a premature burst of the rupture plate 3 of the mechanism.

By the arrangement of providing a pressure control switch comprising a bellows 25 and a microswitch 26 according to the present invention, said bellows 25 extends or stretches as the pressure within the heating apparatus 20 increases, which in turn switch on said microswitch 26 connected thereto. Thus the pressure within the apparatus can be communicated to said microswitch 26 via above constructed bellows 25 such that said switch 26 is actuated in a reliable manner.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A pressure release mechanism for a heating apparatus using saturated vapor of a heating medium comprising:

a pair of metal pipes, a pair of flanges, one each connected air tight to one end of said pipes, a plate holder disposed on either one of said flanges in communication with said pipes, a rupture plate interposed between said pair of pipes and disposed onto said holder by welding, a base formed by securing said pair of flanges with each other at a fastened portion by use of fastener means such that said pipes oppose each other in mutually aligned relationship, and a seal cover made of metal disposed by welding and extending over and between said pair of flanges to cover said fastened portion in an air tight manner.

2. A pressure release mechanism for a heating apparatus using saturated vapor of a heating medium according to claim 1, wherein said base includes a seal interposed between said pair of flanges.

3. A pressure release mechanism for a heating apparatus using saturated vapor of a heating medium according to claim 1, wherein said seal cover is welded to said flanges at an annular ledge.

4. A pressure release mechanism for a heating apparatus using saturated vapor of a heating medium according to claim 1, wherein said seal cover includes outer raised ends which are welded with each other.

5. A pressure release mechanism for a heating apparatus using saturated vapor of a heating medium according to claim 1, wherein said seal cover includes at least one frangible line formed of an endless thin-walled groove which can be easily split open.

6. A pressure release mechanism for a heating apparatus using saturated vapor of a heating medium according to claim 5, wherein said seal cover includes a pull member attached thereto which is used for splitting open the seal cover along said frangible line.

7. A pressure release mechanism for a heating apparatus using saturated vapor of a heating medium according to claim 1, wherein said seal cover includes a tongue and a handle for splitting the seal cover open by rolling up a part thereof.

8. A pressure release mechanism for a heating apparatus using saturated vapor of a heating medium according to claim 7, wherein said seal cover includes a tubular nose for leakage test of the heating apparatus in communication with the exterior and the interior of said cover.

9. A pressure release mechanism for a heating apparatus using saturated vapor of a heating medium according to claim 8, wherein said heating apparatus having the pressure release mechanism includes a pressure control switch to control a gate switch for a heater of said heating apparatus in such manner that between the pressure level A at which said pressure control switch is actuated and the pressure level B at which said pressure release mechanism is actuated, there is a relation of A<B.

10. A pressure release mechanism for a heating apparatus using saturated vapor of a heating medium according to claim 9, wherein said pressure switch comprises a bellows and a microswitch.

11. A pressure release mechanism for a heating apparatus using saturated vapor of a heating medium according to claim 1, wherein said base includes packing interposed between said pair of flanges.

12. A pressure release mechanism for a heating apparatus using saturated vapor of a heating medium according to claim 1, wherein said seal cover is welded to said flanges at a protrusion thereof.

13. A pressure release mechanism for a heating apparatus using saturated vapor of a heating medium according to claim 12, wherein said seal cover includes outer raised ends which are welded with each other.

14. A pressure release mechanism for a heating apparatus using saturated vapor of a heating medium according to claim 3, wherein said seal cover includes at least one frangible line formed of an endless thin-walled groove which can be easily split open.

15. A pressure release mechanism for a heating apparatus using saturated vapor of a heating medium according to claim 2, wherein said seal cover includes a tongue and a handle for splitting the seal cover open by rolling up a part thereof.

16. A pressure release mechanism for a heating apparatus using saturated vapor of a heating medium according to claim 5, wherein said seal cover includes a tongue and a handle for splitting the seal cover open by rolling up a part thereof.

17. A pressure release mechanism for a heating apparatus using saturated vapor of a heating medium according to claim 1, wherein said seal cover includes a tubular nose for leakage test of the heating apparatus in communication with the exterior and the interior of said cover.

18. A pressure release mechanism for a heating apparatus using saturated vapor of a heating medium according to claim 2, wherein said seal cover includes a tubular nose for leakage test of the heating apparatus in communication with the exterior and the interior of said cover.

19. A pressure release mechanism for a heating apparatus using saturated vapor of a heating medium according to claim 1, wherein said heating apparatus having the pressure release mechanism includes a pressure control switch to control a gate switch for a heater of said heating apparatus in such manner that between the pressure level A at which said pressure control switch is actuated and the pressure level B at which said pressure release mechanism is actuated, there is a relation of A<B.

* * * * *